United States Patent
Kim et al.

(10) Patent No.: US 9,832,788 B2
(45) Date of Patent: Nov. 28, 2017

(54) DETECTION OF DATA SCHEDULING ACTIVITY FOR RECEIVER SELECTION

(71) Applicant: Apple Inc., Cupertino, CA (US)

(72) Inventors: Youngjae Kim, San Jose, CA (US); Kee-Bong Song, San Diego, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 34 days.

(21) Appl. No.: 13/924,067

(22) Filed: Jun. 21, 2013

(65) Prior Publication Data
US 2014/0086164 A1   Mar. 27, 2014

Related U.S. Application Data

(60) Provisional application No. 61/704,019, filed on Sep. 21, 2012.

(51) Int. Cl.
| | |
|---|---|
| H04W 72/12 | (2009.01) |
| H04W 52/02 | (2009.01) |
| H04W 88/06 | (2009.01) |

(52) U.S. Cl.
CPC ... *H04W 72/1278* (2013.01); *H04W 52/0216* (2013.01); *H04W 52/0225* (2013.01);
(Continued)

(58) Field of Classification Search
CPC .................................................. H04W 52/0216
(Continued)

(56) References Cited

U.S. PATENT DOCUMENTS

| | | |
|---|---|---|
| 8,179,833 B2 | 5/2012 | Attar et al. |
| 8,229,493 B1 | 7/2012 | Oroskar et al. |
| (Continued) | | |

FOREIGN PATENT DOCUMENTS

| | | |
|---|---|---|
| JP | 2009526497 | 7/2009 |

OTHER PUBLICATIONS

International Search Report and Written Opinion from PCT/US2013/059363, dated May 13, 2014, Apple Inc., pp. 1-14.
(Continued)

*Primary Examiner* — Brandon Renner
*Assistant Examiner* — Jay Vogel
(74) *Attorney, Agent, or Firm* — Meyertons Hood Kivlin Kowert & Goetzel, P.C.; Jeffrey C. Hood

(57) ABSTRACT

Mechanisms for operating a wireless user equipment device, to determine the state of data scheduling activity. Such activity state (and other information such as measurements of signal interference and/or channel condition) may be used to dynamically control the selection of a high-power high-performance receiver vs. a low-power basic receiver. A first mechanism involves transitioning to a high activity state and starting a timer upon each occurrence of scheduled subframe. A transition to the low activity state occurs whenever the timer expires. A second mechanism involves filtering a sequence of binary-valued indicators corresponding respectively to a sequence of time intervals. Each indicator indicates whether a subframe is scheduled during the corresponding time interval. The filter output is compared to a threshold to determine high/low activity state. The temporal width of the filter impulse response may be increased to support fast initial response without harming the accuracy of activity-state determination in the steady state.

18 Claims, 10 Drawing Sheets

(52) U.S. Cl.
CPC ........ *H04W 52/0274* (2013.01); *H04W 72/12* (2013.01); *H04W 88/06* (2013.01); *Y02B 60/50* (2013.01)

(58) Field of Classification Search
USPC .................................................. 370/329, 311
See application file for complete search history.

(56) References Cited

U.S. PATENT DOCUMENTS

| | | | |
|---|---|---|---|
| 8,331,493 B2 | 12/2012 | Vaisanen et al. | |
| 8,429,475 B2* | 4/2013 | Duggan | 714/748 |
| 2007/0184811 A1* | 8/2007 | Ballantyne | 455/343.2 |
| 2009/0296643 A1 | 12/2009 | Cave et al. | |
| 2010/0130219 A1 | 5/2010 | Cave et al. | |
| 2010/0223522 A1 | 9/2010 | Duggan | |
| 2011/0206144 A1* | 8/2011 | Yamamoto et al. | 375/259 |
| 2012/0120860 A1* | 5/2012 | Chui | H04B 1/711 370/311 |
| 2012/0178445 A1 | 7/2012 | Dalsgaard et al. | |
| 2013/0114436 A1 | 5/2013 | Dural et al. | |
| 2013/0195229 A1* | 8/2013 | Cheng et al. | 375/343 |
| 2013/0223353 A1* | 8/2013 | Liu | H04W 76/023 370/329 |

OTHER PUBLICATIONS

Office Action from Taiwanese Application No. 102133959, dated Jan. 22, 2015, English and Chinese versions, pp. 1-13.
International Preliminary Examination from PCT/US2013/059363, mailed Nov. 27, 2014, Apple Inc., pp. 1-26.
Office Action for Japanese Patent Application No. 2015-532032, dated Nov. 21, 2016, pp. 1-6.
Office Action for Chinese Patent Application No. 201380045317.0, dated Aug. 17, 2017, pp. 1-7.

* cited by examiner

900 analyze a received control channel to detect occurrences of scheduled subframes  910 dwell in a first scheduling state when an activity timer is not running  915 in response to detecting the occurrence of at least N scheduled subframes within the Y most recent subframe periods, transition to a second scheduling state and start the activity timer, where $1 \leq N \leq Y$  920 transition to the first scheduling state when the activity timer expires  925 control selection of the first receiver vs. the second receiver based on control data, wherein the control data includes information indicating whether a current state equals the first scheduling state or the second scheduling state  930

*FIG. 9*

1100 receive a sequence of binary-valued indicators corresponding respectively to a sequence of time intervals, wherein each of the binary-valued indicators indicates whether or not a subframe is scheduled in a corresponding one of the time-intervals   1110 filter the sequence of binary-valued indicators with a filter to obtain an output sequence, wherein said filtering includes increasing a temporal width of an impulse response of the filter from a first positive value to a second positive value which is larger than the first positive value   1115 apply a threshold to a current value of the output sequence to obtain a decision value indicating whether a state of data scheduling activity is high or low   1120 control selection of the first receiver vs. the second receiver based on control data including the decision value   1125

*FIG. 11*

DETECTION OF DATA SCHEDULING ACTIVITY FOR RECEIVER SELECTION

RELATED APPLICATION DATA

This application claims the benefit of priority to U.S. Provisional Application No. 61/704,019, filed on Sep. 21, 2012, entitled "Detection of Data Scheduling Activity for Receiver Selection", which is hereby incorporated by reference in its entirety as though fully and completely set forth herein.

FIELD

The presently-disclosed embodiments relate to wireless communication devices, and more particularly, to mechanisms for adaptive selection of receivers in a wireless user equipment device.

DESCRIPTION OF THE RELATED ART

Wireless communication systems are rapidly growing in usage. Further, wireless communication technology has evolved from voice-only communications to also include the transmission of data, such as Internet and multimedia content.

A wireless device may include both a high-power high-performance receiver and a low-power basic receiver. There is a basic need to save power, and thus, to avoid unnecessary use of the high-power receiver. Also, there is a basic need to achieve acceptable decoding performance under challenging interference environments where the low-power basic receiver may not suffice. More generally, there exists a need for mechanisms capable of achieving an optimal (or improved) balance between power savings and performance of data decoding while using the two types of receiver.

SUMMARY

A wireless user equipment (UE) device may be configured to wirelessly communicate with a base station. In some implementations, the UE device may include a high-power high-performance (HPHP) receiver, a low-power basic (LPB) receiver and a processing element. The processing element may be configured to analyze or monitor a received control channel to detect occurrences of scheduled subframes. (The control channel may be part of a transmission from a base station.) The processing element may dwell in a first scheduling state when a certain activity timer is not running. In response to each detection of the occurrence of a scheduled subframe, the processing element may transition to a second scheduling state and start the activity timer. Furthermore, the processing element may transition to the first scheduling state when the activity timer expires. The processing element may control selection between the HPHP receiver and the LPB receiver based on control data, where the control data includes information indicating whether the current state equals the first scheduling state or the second scheduling state. The control data may also include a measure of channel condition and/or a measure of received signal interference.

In other implementations, the processing element may be configured to analyze a received control channel to detect occurrences of scheduled subframes. The processing element may dwell in a first scheduling state when an activity timer is not running. In response to detecting the occurrence of at least N scheduled subframes within the Y most recent subframe periods, the processing element may transition to a second scheduling state and start the activity timer, where $1 \leq N \leq Y$. Furthermore, the processing element may transition to the first scheduling state when the activity timer expires. The processing element may control selection between the HPHP receiver and the LPB receiver based on control data, where the control data includes information indicating whether the current state equals the first scheduling state or the second scheduling state. The control data may also include a measure of channel condition and/or a measure of received signal interference.

In yet other implementations, the processing element may be configured to receive a sequence of binary-valued indicators corresponding respectively to a sequence of time intervals, wherein each of the binary-valued indicators indicates whether or not a subframe is scheduled in a corresponding one of the time-intervals. The processing element may filter the sequence of binary-valued indicators with a filter to obtain an output sequence. The action of filtering may include increasing the temporal width of the impulse response of the filter from a first positive value to a second positive value which is larger than the first positive value. Furthermore, the processing element may apply a threshold to a current value of the output sequence to obtain a decision value indicating whether scheduling activity is high or low. The decision value may be used to control selection between the HPHP receiver and the LPB receiver. The control data may also include a measure of channel condition and/or a measure of received signal interference.

In one implementation, the filter is a single-tap IIR filter. In this case, the temporal width of the filter impulse response may be increased by decreasing a filter coefficient corresponding to the single tap over a predetermined interval of time.

In another implementation, the filter is an FIR filter. In this case, the temporal width of the filter impulse response may be increased by increasing a size of a filter window (used by the FIR filter) over a predetermined interval of time.

Some of the implementations disclosed herein are explained in the context of HSDPA (High-Speed Downlink Packet Access), a third generation (3G) mobile telephony communications protocol in the High-Speed Packet Access (HSPA) family. However, it should be understood that the inventive principles described herein apply broadly to any of a wide variety of communication protocols and technologies.

BRIEF DESCRIPTION OF THE DRAWINGS

A better understanding of the present invention can be obtained when the following detailed description of the embodiments is considered in conjunction with the following drawings.

FIG. 9 is a flowchart illustrating a second embodiment of the timer-based method for determining the current state of data scheduling activity.

FIG. 11 illustrates one embodiments of a filter-based method for determining the current state of data scheduling activity.

Figure 1:
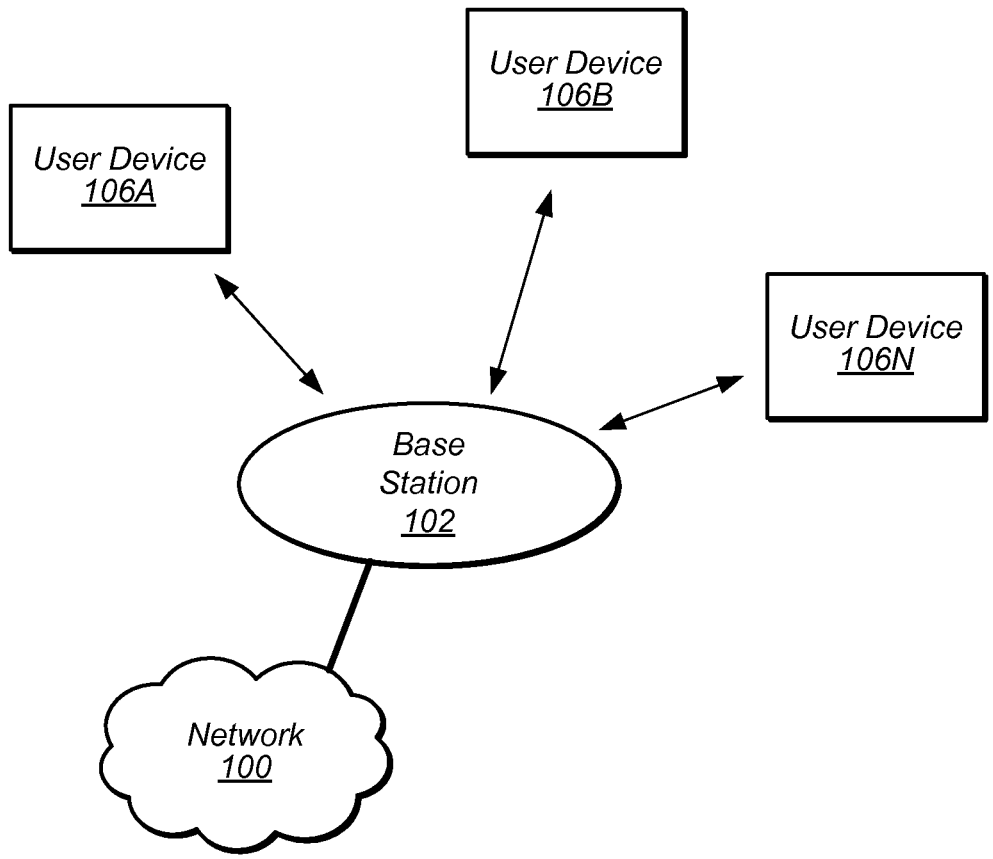
FIG. 1 illustrates an example of a wireless communication system, including a base station (BS) and a plurality of user devices.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the present disclosure as defined by the appended claims.

DETAILED DESCRIPTION

List of Acronyms

The following acronyms are used in the present Patent Application:
AIC: Advanced Interference Cancellation
ASIC: Application Specific Integrated Circuit
BS: Base Station
CPICH: Common Pilot Channel
DL: Downlink
EPS: Evolved Packet System
FIR: Finite Impulse Response
FPGA: Field Programmable Gate Array
GSM: Global System for Mobile Communications
HS-SCCH: High Speed Shared Control Channel
HSDPA: High-Speed Downlink Packet Access
IIR: Infinite Impulse Response
LTE: Long Term Evolution
MAC: Media Access Control
PHE: Programmable Hardware Element
RRC: Radio Resource Control
Rx: Reception or Receive or Receiver
SNR: Signal-to-Noise Ratio
TTI: Transmit Time Interval
Tx: Transmission or Transmit or Transmitter
UE: User Equipment
UL: Uplink
UMTS: Universal Mobile Telecommunication System Terminology The following is a glossary of terms used in the present application:

Memory Medium—Memory Medium—A memory medium is a medium configured for the storage and retrieval of information. Examples of memory media include: various kinds of semiconductor memory such as RAM and ROM; various kinds of magnetic media such as magnetic disk, tape, strip, film, etc.; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. As used herein, the term "program" includes within its scope of meaning: 1) a software program which is stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Computer System—any of various types of computing or processing systems, including a computer system (PC), mainframe computer system, workstation, laptop computer, tablet computer, network appliance, Internet appliance, personal digital assistant (PDA), mobile phone, media player, television system, grid computing system, or other device or combinations of devices. In general, the term "computer system" can be broadly defined to encompass any device (or combination of devices) having at least one processor that executes instructions stored in a non-transitory memory medium.

User Equipment (UE) (or "UE Device")—any of various types of computer systems devices which are mobile or portable and which performs wireless communications. Examples of UE devices include mobile phones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, media players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "base station" has the full breadth of its ordinary meaning, and at least includes a wireless communication station installed (e.g., at a fixed location) and used to communicate as part of a wireless communication system or radio system.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Processing Unit—refers to a processing element or a combination of processing elements operating together to perform a defined function (or set of functions). Processing elements include, for example, circuits such as an ASIC (Application Specific Integrated Circuit), portions of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
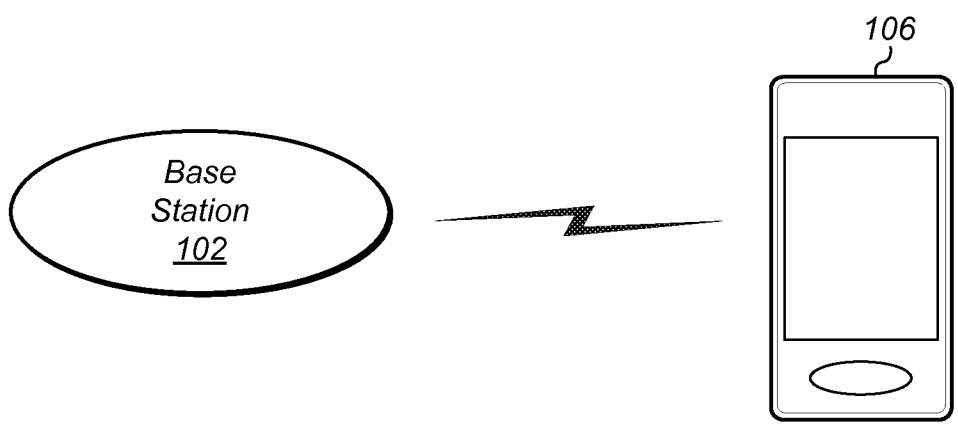
FIG. 2 illustrates an example of the base station 102 in communication with a user equipment (UE) device 106.

FIGS. 1 and 2—Communication System

FIG. 1 illustrates an example of a wireless communication system that may be used to implement any or all of the embodiments of the present disclosure. (However, it should be understood the embodiments of the present disclosure are not limited to the context established by FIG. 1. A variety of other communication system architectures are contemplated.) The wireless communication system may include a base station 102 and one or more user equipment (UE) devices 106A through 106N. The base station 102 communicates over a transmission medium (e.g., the atmosphere or free space or a body of fluid) with the UE devices 106A through 106N.

The base station 102 may be a base transceiver station (BTS) or cell site, and may include hardware that enables wireless communication with the UE devices 106A through 106N. The base station 102 may also be equipped to communicate with a network 100. Thus, the base station 102 may facilitate communication between the UE devices and/or between the UE devices and the network 100. The communication area (or coverage area) of the base station may be referred to as a "cell." The base station 102 and the UE devices may be configured to communicate over the transmission medium using any of various wireless communication technologies and/or standards such as HSDPA, LTE, UMTS, GSM, CDMA, WLL, WAN, WiFi, WiMAX, Bluetooth, etc.

FIG. 2 illustrates UE device 106 (e.g., one of the devices 106A through 106N) in communication with the base station 102. The UE device 106 may be a device with wireless network connectivity such as a mobile phone, a hand-held device, a computer or a tablet, a media player, personal digital assistant or virtually any type of wireless device. The UE device 106 may include a processor that is configured to execute program instructions stored in memory. The UE device may perform any of the method embodiments described herein by executing such stored instructions. In some embodiments, the UE device may include a programmable hardware element such as an FPGA (field-programmable gate array) that is configured to perform any of the method embodiments described herein, or any portion of any of the method embodiments described herein.

In some embodiments, the UE device 106 may be configured to perform adaptive receiver selection as variously described below.

Figure 3:
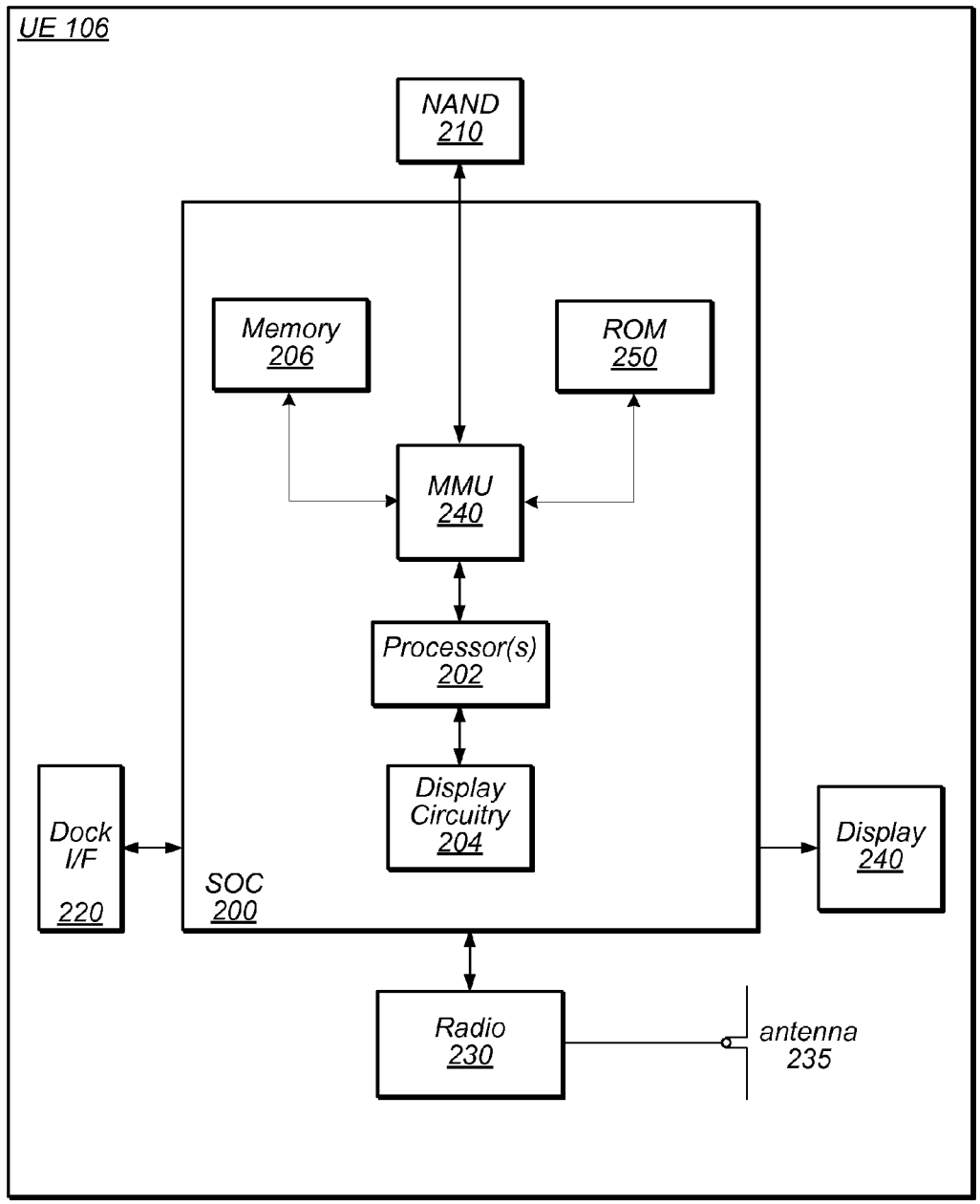
FIG. 3 shows a block diagram for one embodiment of the user equipment 106.

FIG. 3—Example Block Diagram of a UE Device

FIG. 3 illustrates an exemplary block diagram of a UE device 106. As shown, the UE device 106 may include a system on chip (SOC) 200, which may include portions for various purposes. For example, the SOC 200 may include processor(s) 202 and display circuitry 204. The processor(s) 202 may execute program instructions for the UE device 106. The display circuitry 204 may perform graphics processing and provide display signals to the display 240. The processor(s) 202 may also be coupled to memory management unit (MMU) 240. MMU 240 may be configured to receive addresses from the processor(s) 202 and translate those addresses to locations in memory, e.g., memory 206, read only memory (ROM) 250 and flash memory 210. ROM 250 may include a bootloader, which may be executed by the processor(s) 202 during boot up or initialization. The MMU 240 may be configured to perform memory protection and page table translation and/or set up. In some embodiments, the MMU 240 may be included as a portion of the processor(s) 202.

The SOC 200 may couple to other circuits or devices, such as flash memory 210, connector interface 220, radio subsystem 230 and display 240.

The connector interface 220 may be configured for coupling to an external computer system.

The radio subsystem 230 may be configured for wireless communication with base stations and/or other devices according to one or more radio access technologies. The radio subsystem 230 may include one or more wireless transceivers (e.g., wireless transceivers configured for communication via HSDPA, LTE, UMTS, GSM, CDMA, WLL, WAN, WiFi, WiMAX, Bluetooth, etc.)

In some embodiments, the radio subsystem 230 includes a first receiver and a second receiver. In other embodiments, the first receiver and the second receiver may be implemented by processor(s) 202. In yet other embodiments, the first receiver and the second receiver are implemented by the radio subsystem 230 and the processor(s) 202 operating together. The second receiver may be configured to operate with higher power than the first receiver. Furthermore, the second receiver may employ a more complex decoding algorithm that achieves lower decoding error rate and/or higher data rate than the first receiver. Various methods for controlling which of the receivers is used at any given moment in time are described below.

The UE device 106 may include a set 235 of one or more antennas. The radio subsystem 230 receives and transmits signals into space through the antenna set 235. For example, the UE device 106 may use the antenna set 235 to perform the wireless communication. In some embodiments, the antenna set 235 includes two or more antennas, and the radio subsystem 230 is configured for MIMO communication with base stations using the two or more antennas.

The processor(s) 202 of the UE device 106 may be configured to implement any of the method embodiments described herein or parts thereof, e.g., by executing program instructions stored on a memory medium (e.g., a non-transitory computer-readable memory medium). In some embodiments, the UE device 106 may include one or more programmable hardware elements such as FPGAs (Field Programmable Gate Arrays), and/or, one or more ASICs (Application-Specific Integrated Circuits).

Figure 4:
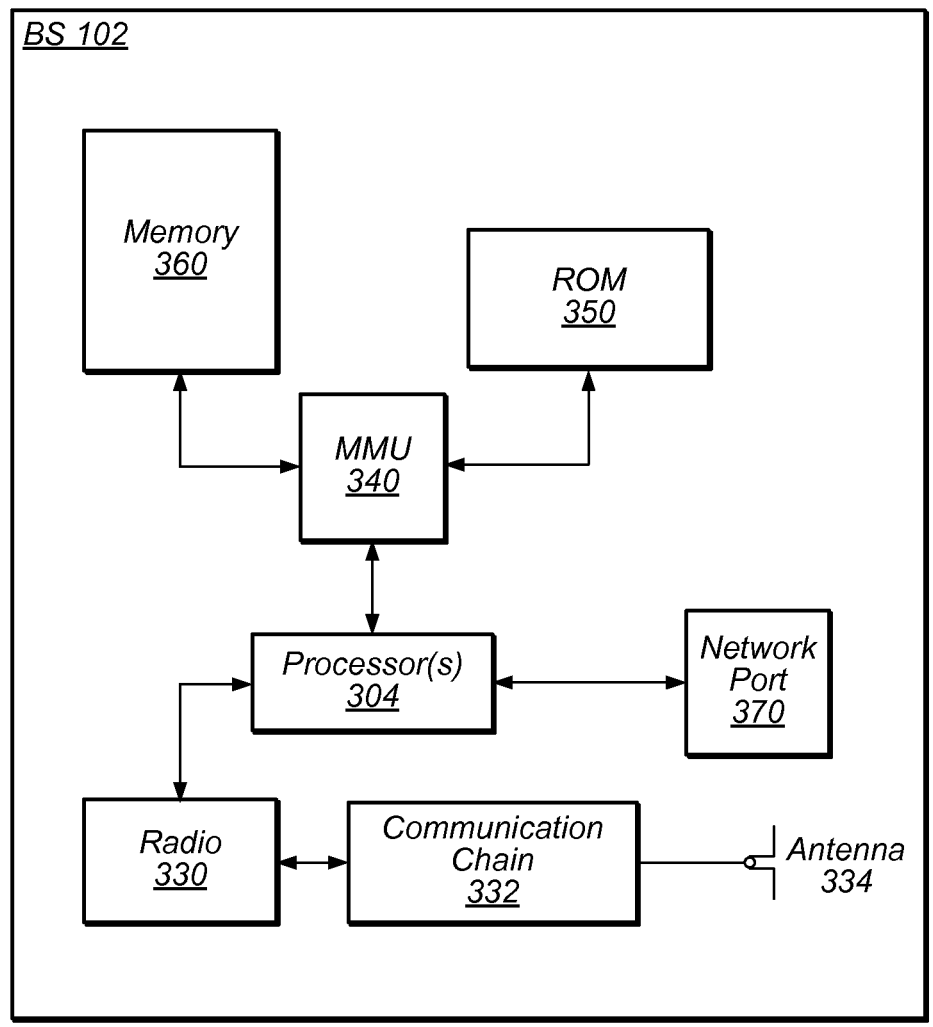
FIG. 4 depicts a block diagram for one embodiment of the base station 102.

FIG. 4—Base Station

FIG. 4 illustrates an example of the base station 102. As shown, the base station 102 may include processor(s) 304 which execute program instructions for the base station 102. The processor(s) 304 may also be coupled to memory management unit (MMU) 340, which is configured to receive addresses from the processor(s) 304 and translate those addresses to locations in memory, e.g., memory 360 and read only memory (ROM) 350.

The base station 102 may include a set 370 of one or more network ports. The network port(s) 370 may be configured to couple to a network (e.g., a data network and/or a telephone network) and provide a plurality of devices, such as UE devices 106, with access to the network.

The network port(s) 370 may also (or alternatively) be configured to couple to a cellular network, e.g., a core network of a cellular service provider. The core network may provide mobility-related services and/or other services to devices such as UE devices 106. In some cases, the network port(s) 370 may couple to a telephone network via the core network, and/or the core network may provide a telephone network.

The base station 102 may include a set 334 of one or more antennas. The antenna set 334 may be used in conjunction with radio subsystem 330 and communication chain 332 to wirelessly communicate with UE devices 106. The antenna set 334 may couple to the radio subsystem 330 via communication chain 332. Communication chain 332 may include one or more receive chains and one or more transmit chains. The receive chains may include RF-to-baseband down-conversion circuitry. The transmit chains may include baseband-to-RF up-conversion circuitry.

The radio subsystem 330 may be configured to demodulate baseband signals supplied by the communication chain 332 and to generate modulated baseband signal for transmission by the communication chain 332. The radio subsystem 330 and the communication chain 332 may be configured to support one or more wireless telecommunication standards, e.g., standards such as HSDPA, LTE, UMTS, GSM, CDMA, WLL, WAN, WiFi, WiMAX, Bluetooth, etc.

The processor(s) 304 of the base station 102 may be configured to implement any or all of the methods described herein, e.g., by executing program instructions stored in a memory medium (e.g., a non-transitory computer-readable memory medium). In some embodiments, the processor(s) 304 may include one or more programmable hardware elements such as FPGAs, and/or, dedicated digital circuitry elements such as one or more ASICs. Thus, any or all of the methods described herein may be implemented in such programmable hardware and/or dedicated digital circuitry.

Figure 5:
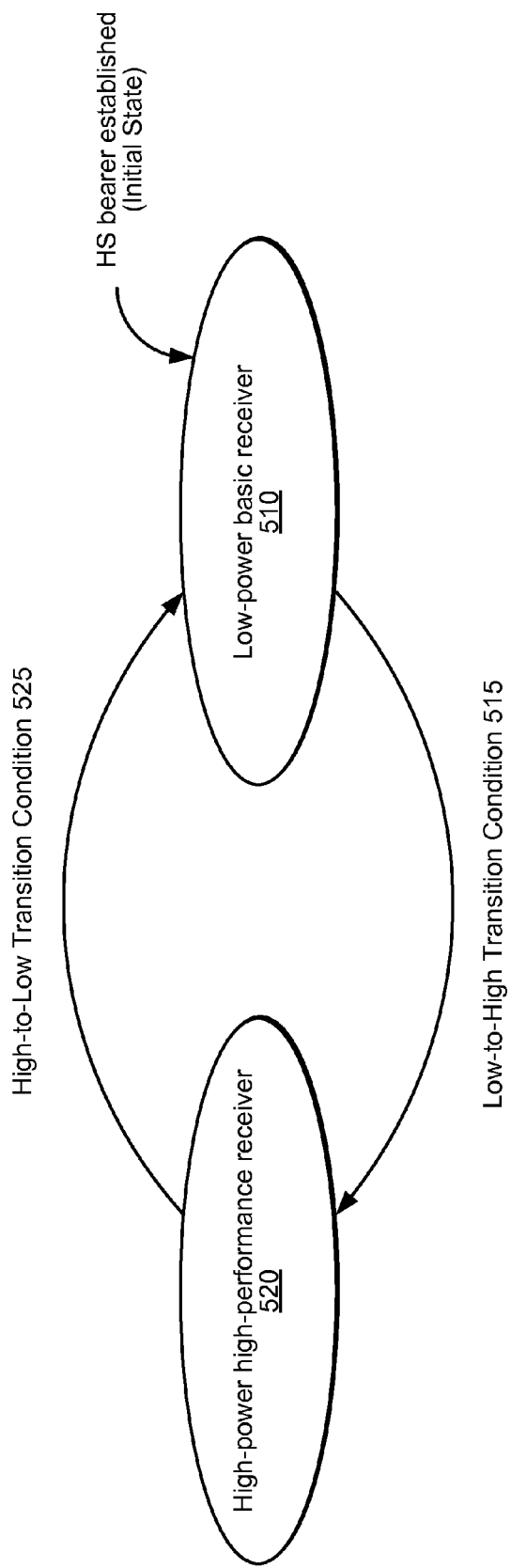
FIG. 5 presents one embodiment of a state diagram for adaptive selection between a high-power high-performance receiver and a low-power basic receiver.

FIG. 5: State Machine for Receiver Selection

In one set of embodiments, data scheduling activity may be used as the criterion (or, one of the criteria) to select between a high-power high-performance receiver and a low-power basic receiver in the user equipment (UE) device 106. The selected receiver may operate on received baseband data (e.g., a received sequence of symbols) to recover estimates of the underlying information bits that were transmitted by the base station. The high-power high-performance (HPHP) receiver may be a receiver that employs an advanced interference cancellation (AIC) algorithm. The low-power basic (LPB) receiver may be a receiver that employs a linear equalization algorithm. The HPHP receiver and the LPB receiver may be implemented by a processor in response to the execution of program instructions, by a programmable hardware element such as an FPGA, by dedicated digital circuitry such as an ASIC, or by any combination of the foregoing.

FIG. 5 shows a state diagram for adaptively selecting which receiver to use at any given moment in time. The method of FIG. 5 and the other methods described herein may be used in conjunction with any of a wide variety of communication protocols. In some embodiments, the method of FIG. 5 and the other methods described herein may be implemented in the context of HSDPA.

When a high-speed (HS) bearer is established, the UE device enters the state 510. In this state, the modem of the UE device may employ the low-power basic (LPB) receiver. Thus, state 510 may be referred to as the LPB receiver state. The term "bearer" means a virtual connection. The term "high-speed bearer" means a virtual data pipe through which high-speed data can be transmitted. (Examples of high-speed bearers include HS bearer in HSDPA or EPS bearer in LTE. EPS is an acronym for Evolved Packet System.) A high-speed bearer may be established, for example, when an HSDPA-capable UE has successfully negotiated with the base station to enable a high-speed data transmission.

While in the state 510, the UE device may repeatedly, e.g., continuously or periodically, evaluate a low-to-high (LH) transition condition 515. The UE device may transition to state 520 in response to the LH transition condition evaluating to TRUE. In state 520, the modem of the UE device may employ the high-power high-performance (HPHP) receiver. Thus, the state 520 may be referred to as the HPHP receiver state.

In some embodiments, the LH transition condition 515 may have the form:

LH Transition Condition=
(Amount of Interference is Significant)
AND
{(Data scheduling activity is High) OR (Channel condition<$TH_{CC1}$)}.

However, a wide variety of other forms are contemplated.

The term "amount of interference" refers to the amount of interference in one or more of the signals being received by the UE device. The amount of interference may be measured in any of various ways known in the prior art. (1) For example, in one embodiment, the UE device may measure the amount of interference by counting the number $K_{CE}$ of non-trivial (i.e., sufficiently large) taps in a channel estimate generated based on the CPICH of the serving cell (i.e., the base station of the cell that is currently serving the UE device). The channel estimate may be expressed as a discrete-time impulse response. The receiver subsystem 230 and/or processor(s) 202 may be configured to generate this channel estimate. The serving cell transmits known pilot symbols in the CPICH in order to facilitate the channel estimation by the UE device. (2) In another embodiment, the UE device may measure the amount of interference by counting the number $N_{NC}$ of detected neighboring cells (i.e., cells other than the serving cell). Cells may be detected by monitoring the synchronization channel and the CPICH of the cells. In some embodiments, both techniques (1) and (2) may be used simultaneously. Thus, the amount of interference may be computed based on a combination of the number $K_{CE}$ and the number $N_{NC}$.

The determination of whether the amount of interference is significant or not may be performed by comparing the amount of interference to a predetermined threshold $TH_{INF1}$. The amount of interference is recognized as being significant if the amount of interference is greater than the threshold. The threshold $TH_{INF1}$ may be determined based on a trade off between the benefit of higher data rate and/or lower decoding error rate provided by the HPHP receiver and the benefit of the lower power consumption provided by the LPB receiver.

The data scheduling activity may represent the amount (or fraction) of a communication resource that is allocated to the UE device. The base station may control the scheduling of the resource among the set of UE devices within the area of coverage of that base station. The resource may include a set of time slots in the context of TDMA.

In some embodiments, the data scheduling activity may be expressed in terms of a data scheduling ratio, e.g., a ratio computed from information contained in a received control channel. (For example, in the context of HSDPA, the control channel may be the HS-SCCH. HS-SCCH is an acronym for High-Speed Shared Control Channel.) In one embodiment, the data scheduling ratio may be computed as the ratio of the number of scheduled subframes (or data packets) to the total number of subframes (or data packets) over a predetermined period of time.

The evaluation of whether the data scheduling activity is high or low may be performed by comparing the data scheduling activity (or ratio) to a threshold $TH_{DSA1}$. The threshold $TH_{DSA1}$ may be determined based on a trade off between the benefit of higher data rate and/or lower decoding error rate provided by the HPHP receiver and the benefit of the lower power consumption provided by the LPB receiver.

The channel condition may be determined based on measurement of a received pilot signal. The channel condition represents the condition of the channel between the base station and the UE device, e.g., between the antenna(s) of the base station and the antenna(s) of the UE device. Larger values of channel condition may correspond to higher channel quality. In order to facilitate the measurement of channel condition, the pilot signal may include a known sequence of data bits or symbols. In the context of HSDPA, the pilot signal may be included in the CPICH. In the context of LTE, the pilot channel may be included in the Reference Signal (RS).

In the context of UMTS and other CDMA communications systems, the pilot signal may be the Common Pilot Channel (CPICH). In some embodiments, the channel condition may be (or include) the signal-to-noise ratio (SNR) of the pilot signal.

The channel condition may be compared to a threshold $TH_{CC1}$. In some embodiments, $TH_{CC1}$ is in the range [8.75 dB, 9.25 dB]. In other embodiments, $TH_{CC1}$ is in the range [8.5 dB, 9.5 dB]. However, a wide variety of other values or ranges of values for the threshold $TH_{CC1}$ may be used depending on the signal environment and/or the communication standard being employed.

The high-power high-performance (HPHP) receiver may be able to more effectively cancel interference in the received signal(s), and thus, achieve lower decoding error rate and/or higher data rate than the low-power basic (LPB) receiver. For example, the HPHP receiver may achieve lower decoding error rate than the LPB receiver if the modulation and coding scheme (MCS) is fixed. Alternatively, the HPHP receiver may achieve a higher data rate than the LPB receiver in the situation where adaptive MCS is employed. (For example, the HPHP receiver may employ a higher order MCS than the LPB receiver, and achieve the same or lower decoding error rate than the LPB receiver.) As noted above, the HPHP receiver may utilize an advanced interference cancellation (AIC) algorithm. Examples of advanced interference cancellation algorithms include MMSE-DFE or its variants. MMSE stands for Minimum Mean Square Error. DFE stands for Decision Feedback Equalizer. In the MMSE-DFE algorithm, the equalizer makes decoding decisions regarding a first subset of the transmitted symbols based on a first subset of a received symbol sequence. The decisions are provided to a feedback filter. The output of the feedback filter is subtracted from a second subset of the received symbol sequence to obtain difference symbols. The equalizer makes decoding decisions regarding a second subset of the transmitted symbols based on the difference values. (These decisions are likely to be more accurate since the ISI due to the first subset of transmitted symbols has been removed.) These decisions are then provided to the feedback filter, and the output of the filter is subtracted from a third subset of the received symbol sequence, and so on. The concept of DFE was originally intended for the serving cell only, but it can be extended in order to remove interference from a neighboring cell as follows. The equalizer makes a decision on the neighboring-cell transmissions, and removes those transmissions from the received signal to better estimate the transmissions from the serving cell.

While in the HPHP receiver state 520, the UE device may repeatedly, e.g., continuously or periodically, evaluate a high-to-low (HL) transition condition 525. The UE device may transition to the LPB receiver state 510 in response to the HL transition condition evaluating to TRUE. When in the LPB receiver state 510, the UE device employs the LPB receiver.

In some embodiments, the HL transition condition 525 may have the following form:
HL Transition Condition=
(Amount of Interference is Small)
  OR
{(Data Scheduling Activity is Low) AND (Channel condition>$TH_{CC2}$)}.

However, a wide variety of other forms are contemplated. The amount of interference, the data scheduling activity and the channel condition may be determined as variously described above.

The action of determining whether the amount of interference is small may be performed by comparing the amount of interference to a predetermined threshold $TH_{INF2}$. In particular, the amount of interference may be declared to be small if the amount of interference is less than a threshold $TH_{INF2}$. The threshold $TH_{INF2}$ may be the same as or different from the threshold $TH_{INF1}$ used above to determine if the amount of interference is significant. (For example, in some embodiments, $TH_{INF2} < TH_{INF1}$.)

The action of determining whether the data scheduling activity is low may be performed by comparing the data scheduling activity to a predetermined threshold $TH_{DSA2}$. In particular, the data scheduling activity is said to be low if the data scheduling activity is less than the threshold $TH_{DSA2}$. The threshold $TH_{DSA2}$ may be the same as or different from the threshold $TH_{DSA1}$ used above to determine if the data scheduling activity is high. (For example, in some embodiments, $TH_{DSA2} < TH_{DSA1}$.)

As noted above, the channel condition may be compared to a threshold $TH_{CC2}$. As above, the channel condition may be measured from the pilot signal-to-noise ratio (e.g., CPICH SNR). In some embodiments, $TH_{CC2}$ is a value in the range [9.75 dB, 10.25 dB]. In other embodiments, $TH_{CC2}$ is a value in the range [9.5 dB, 10.5 dB]. However, a wide variety of other values or ranges of values for $TH_{CC2}$ may be used, e.g., depending on the signal environment and/or on the communication standard being employed.

It should be understood that the extent of power saving and the performance of data decoding may vary depending on the way the data scheduling activity is measured.

Data Scheduling Ratio Over Fixed Window Size

As described above, to determine whether the data scheduling activity is low or high, the UE modem may compare the data scheduling ratio to a pre-determined threshold. In the context of HSDPA, the data scheduling ratio may be computed by counting the number of scheduled subframes within a fixed-size measurement window. (The term "scheduled subframe" refers to a subframe that has been assigned to the present UE device rather than to some other UE devices or to none of the UE devices.) For example, if the measurement window has a size equal to 20 subframes, and three subframes are scheduled over the 20 subframe window, the scheduling ratio is 3/20 or 15%. It should be understood that the value 20 for the size of the measurement window is not meant to be limiting. Indeed, a wide variety of other values or ranges of values may be used.

Note that different performance metrics are compromised when the window size is small vs. large. A small measurement window size implies that the time until the first measurement of data scheduling activity becomes available is small, enabling the UE device to more quickly switch to the high-power high-performance receiver when data scheduling activity transitions to the high state. However, the small measurement window size also implies a higher probability of falsely declaring that the data scheduling activity is low when in fact the data scheduling activity is high but bursty or intermittent. A large measurement window size is more robust in detecting high data scheduling activity, but is slow in initialization.

Timer-Based Control of the State of Data Scheduling Activity

Figure 6:
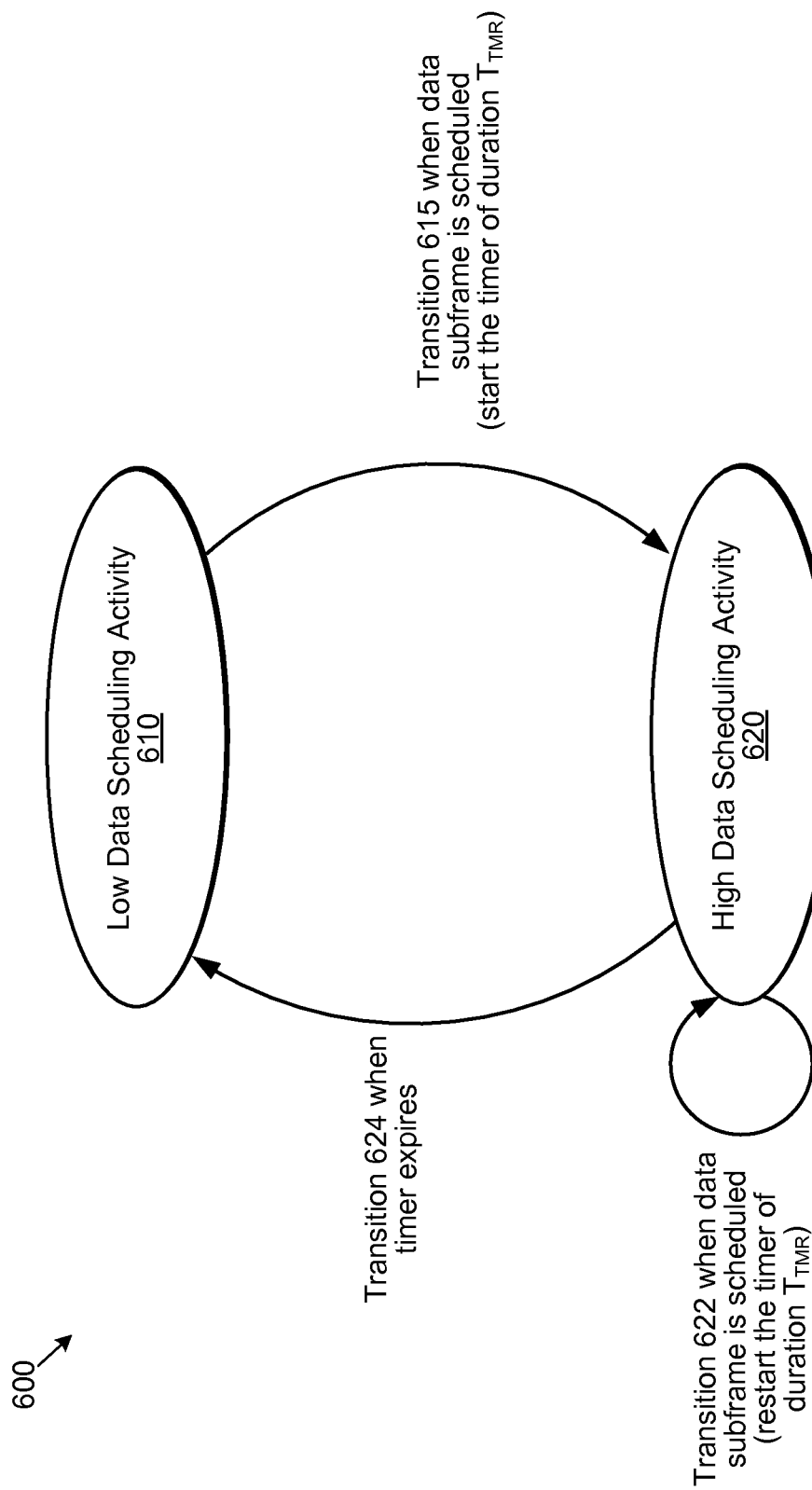
FIG. 6 gives an example of a state machine for determining the state of data scheduling activity.

In some embodiments, the state (high or low) of the data scheduling activity may be determined with a timer-based state machine 600 as shown in FIG. 6. The modem of the UE device may execute this state machine 600, e.g., as part of the state machine of FIG. 5.

The state machine 600 may be initialized in the state 610 of low data scheduling activity (DSA).

Whenever a data subframe is scheduled, the modem of the UE device may transition to the state 620 of high data scheduling activity. See transition 615 in FIG. 6. As part of the transition 615, a timer of predetermined duration $T_{TMR}$ (e.g., a predetermined number of milliseconds) is started. The state machine 600 may remain in the high DSA state until the timer expires.

Whenever a data subframe is scheduled while the timer is still running, the modem of the UE device transitions from the high DSA state to the high DSA state, as indicated at transition 622 of FIG. 6. As part of transition 622, the timer is restarted at its initial value $T_{TMR}$.

When the timer expires, the state machine 600 transitions from the high DSA state 620 to the low DSA state 610, as indicated at transition 624.

The state machine 600 may remain in the low DSA state while the timer is not running.

The state machine 600 may assume that the decision is made every TTI (or more generally, every subframe period). TTI is an acronym for transmit time interval. The base station may transmit parcels of data to UE devices in terms of TTIs.

The above-described logic may be generalized to a window of more than one TTI in length. For example, instead of determining if a current data subframe is scheduled, transitions 615 and 622 may involve determining if at least N data subframes are scheduled over a window of Y TTIs, where N and Y are a predetermined integer values such that 1≤N≤Y (or, in some embodiments, 1≤N<Y). Thus, the timer may be started (or restarted) whenever this "at least N of Y" condition is satisfied. The window of Y TTIs may be a moving window of the Y most recent TTIs.

Figure 7:
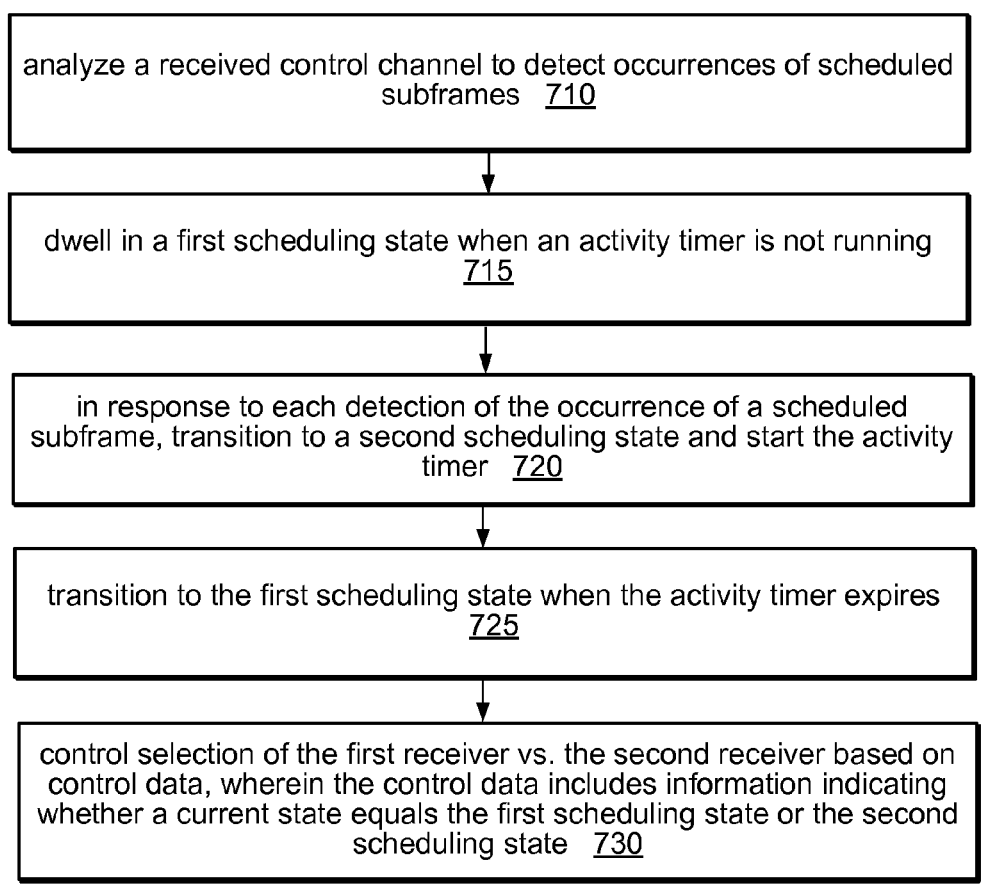
FIG. 7 illustrates one embodiment of a timer-based method for determining the current state of data scheduling activity.

Method 700 (FIG. 7)

In one set of embodiments, a method 700 for operating a user equipment (UE) device may include the operations shown in FIG. 7. (Furthermore, the method 700 may include any subset of the features, elements and embodiments described above.) The method 700 may be performed by a processing agent, e.g., by one or more processors in response to the execution of stored program instructions, by one or more programmable hardware elements such as FGPAs, or by one or more custom-designed digital circuits such as ASICs, or by any combination of the foregoing. The UE device may include a first receiver and a second receiver. The second receiver may be configured to operate with higher power than the first receiver. Furthermore, the second receiver may employ a more complex decoding algorithm (e.g., an advanced interference cancellation algorithm) that achieves lower decoding error rate and/or higher data rate than the first receiver, e.g., as variously described above.

At 710, a processing agent may analyze a received control channel to detect occurrences of scheduled subframes, e.g., as variously described above.

At 715, the processing agent may dwell in a first scheduling state when an activity timer is not running.

At 720, in response to each detection of the occurrence of a scheduled subframe, the processing agent may transition to a second scheduling state and start the activity timer, e.g., as variously described above. This transition includes within its scope of meaning the possibility that the transition is from the first scheduling state to the second scheduling state (as is the case with transition 615 of FIG. 6), and the possibility that the transition is from the second scheduling state to itself (as is the case with transition 622 of FIG. 6). In the latter possibility, the action of starting the activity timer is a restarting of the activity timer.

At 725, the processing agent may transition to the first scheduling state when the activity timer expires.

At 730, the processing agent may control selection of the first receiver vs. the second receiver based on control data, where the control data includes information indicating whether the current state equals the first scheduling state or the second scheduling state. Being in the first scheduling state tends to bias the selection towards the first receiver. Conversely, being in the second scheduling state tends to bias the selection towards the second receiver. However, other factors may be involved in the selection, e.g., as variously described above in connection with FIG. 5. The selected receiver may operate on a received baseband signal (e.g., a baseband signal produced by frontend which includes down-conversion circuitry and analog-to-digital conversion circuitry) to produce an output bit stream. The bits of the output bit stream represent estimates of corresponding bits of an original bit stream transmitted by the base station.

In some embodiments, the first receiver is configured to employ a linear equalization algorithm, and/or, the second receiver is configured to employ an advanced interference cancellation algorithm.

In some embodiments, the control data also includes a measure of channel condition, e.g., as variously described above. In these embodiments, the action of controlling the selection of the first receiver vs. the second receiver may include comparing the measure of channel condition to a predetermined threshold. The measure of channel condition being greater than the threshold tends to bias the selection towards the first receiver. Conversely, the measure of channel condition being less than the threshold tends to bias the selection towards the second receiver.

In some embodiments, the control data also includes a measure of received signal interference, e.g., as variously described above. In these embodiments, the action of controlling the selection of the first receiver vs. the second receiver may include comparing the measure of signal interference to a predetermined threshold. The signal interference measure being greater than the threshold tends to bias the selection towards the second receiver. The signal interference measure being less than the threshold tends to bias the selection towards the first receiver.

In some embodiments, the control data includes a measure of channel condition and a measure of received signal interference, e.g., as variously described above. In these embodiments, the selection of the first receiver vs. the second receiver may be based on a logical combination of three Boolean conditions, where the three Boolean conditions include: (1) a first condition that indicates whether the current state is equal to the first scheduling state or the second scheduling state; (2) a second condition that indicates whether the measure of signal interference is greater than or less than a first threshold; and (3) a third condition that indicates whether the measure of channel condition is greater than or less than a second threshold.

Figure 8:
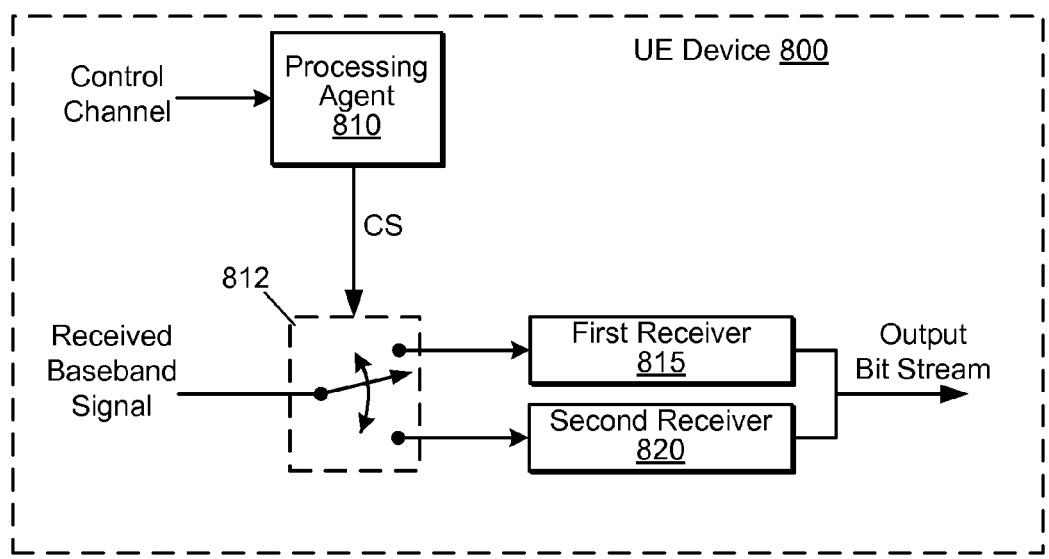
FIG. 8 shows a block diagram of a UE device 800 according to one embodiment.

Wireless UE Device 800 (FIG. 8)

In one set of embodiments, a wireless user equipment (UE) device 800 may be configured to wirelessly communicate with a cellular network as shown in FIG. 8. The UE device includes a processing agent 810 (e.g., as variously described above), a first receiver 815 and a second receiver 820. (The UE device 800 may also include any subset of the features, elements and embodiments described above. In some embodiments, UE device 800 is configured as described above in connection with UE device 106.) The second receiver 820 is configured to operate with higher power than the first receiver 815. Furthermore, the second receiver may employ a more complex decoding algorithm that achieves lower decoding error rate and/or higher data rate than the first receiver.

The processing agent may be configured to: analyze a received control channel to detect occurrences of scheduled subframes; dwell in a first scheduling state when an activity timer is not running; in response to each detection of the occurrence of a scheduled subframe, transition to a second scheduling state and start the activity timer; transition to the first scheduling state when the activity timer expires; and control selection of the first receiver vs. the second receiver based on control data, wherein the control data includes information indicating whether a current state equals the first scheduling state or the second scheduling state. The selection is represented in FIG. 8 as a switch 812 coupling the received baseband signal to the input of one of the receivers. However, the selection function may be performed just as well in terms of program code (software). The processing agent 810 may provide a control signal CS that determines the selection state of the switch 812.

Method 900 (FIG. 9)

In one set of embodiments, a method 900 for operating a wireless user equipment (UE) device may include the operations shown in FIG. 9. (In addition, the method 900 may include any subset of the features, elements and embodiments described above.) The method 900 may be performed by a processing agent, e.g., by one or more processors in response to the execution of stored program instructions, by one or more programmable hardware elements such as FGPAs, or by one or more custom-designed digital circuits such as ASICs, or by any combination of the foregoing. The UE device includes a first receiver and a second receiver, and is configured to wirelessly communicate with a cellular network. The second receiver may be configured to operate with higher power than the first receiver. Furthermore, the second receiver may employ a more complex decoding algorithm (e.g., an advanced interference cancellation algorithm) that achieves lower decoding error rate and/or higher data rate than the first receiver.

At 910, the processing agent may analyze a received control channel to detect occurrences of scheduled subframes, e.g., as variously described above.

At 915, the processing agent may dwell in a first scheduling state when an activity timer is not running.

At 920, in response to detecting the occurrence of at least N scheduled subframes within the Y most recent subframe periods, the processing agent may transition to a second scheduling state and start the activity timer, where N is a predetermined integer value such that $1 \leq N \leq Y$. This transition includes within its scope of meaning the possibility that the transition is from the first scheduling state to the second scheduling state (as is the case with transition 615 of FIG. 6), and the possibility that the transition is from the second scheduling state to itself (as is the case with transition 622 of FIG. 6). In the latter possibility, one may interpret the action of starting the activity timer as a restarting of the activity timer.

At 925, the processing agent may transition to the first scheduling state when the activity timer expires.

At 930, the processing agent may control selection of the first receiver vs. the second receiver based on control data, e.g., as variously described above. The control data includes information indicating whether a current state equals the first scheduling state or the second scheduling state.

In some embodiments, the first receiver is configured to employ a linear equalization algorithm, and/or, the second receiver is configured to employ an advanced interference cancellation algorithm, e.g., as variously described above.

In some embodiments, the control data also includes a measure of channel condition, e.g., as variously described above. In these embodiments, the action of controlling the selection of the first receiver vs. the second receiver may include comparing the measure of channel condition to a predetermined threshold. The measure of channel condition being greater than the threshold tends to bias the selection towards the first receiver. Conversely, the measure of channel condition being less than the threshold tends to bias the selection towards the second receiver.

In some embodiments, the control data also includes a measure of received signal interference, e.g., as variously described above. In these embodiments, the action of controlling the selection of the first receiver vs. the second receiver may include comparing the measure of signal interference to a predetermined threshold. The signal interference measure being greater than the threshold tends to bias the selection towards the second receiver. The signal interference measure being less than the threshold tends to bias the selection towards the first receiver.

In some embodiments, the control data includes a measure of channel condition and a measure of received signal interference, e.g., as variously described above. In these embodiments, the selection of the first receiver vs. the second receiver may be based on a logical combination of three Boolean conditions, where the three Boolean conditions include: (1) a first condition that indicates whether the current state is equal to the first scheduling state or the second scheduling state; (2) a second condition that indicates whether the measure of signal interference is greater than or less than a first threshold; (3) a third condition that indicates whether the measure of channel condition is greater than or less than a second threshold.

In some embodiments, the parameters N and Y are both equal to one: N=Y=1.

In some embodiments, the parameters N and Y are determined by an adaptive tuning algorithm.

In some embodiments, the parameters N and Y are set so that $1 \leq N < Y$.

In some embodiments, the parameters N and Y are set so that $1 < N < Y$.

Since the HPHP receiver has performance gain over the LPB receiver, we would want to use the HPHP receiver on all scheduled subframes if the supply of power were unlimited. Thus, good values of N and Y can be chosen by analyzing the number of subframes that are not decoded with the HPHP receiver. As long as the number of subframes that are not decoded with the HPHP is small enough, one can save power by increasing N and/or decreasing Y. Reasonable values for N and Y may be found by simulating them with some typical traffic patterns (e.g., a typical pattern of user activity including video streaming, web-browsing, etc.)

In one set of embodiments, a wireless user equipment (UE) device that is configured to wirelessly communicate with a cellular network may include a processing agent (e.g., as variously described above), a first receiver and a second receiver. (The UE device may also include any subset of the features, elements and embodiments described above.) The second receiver is configured to operate with higher power than the first receiver. Moreover, the second receiver employs a more complex decoding algorithm that achieves lower decoding error rate and/or higher data rate than the first receiver. The processing agent may be configured to: analyze a received control channel to detect occurrences of scheduled subframes; dwell in a first scheduling state when an activity timer is not running; in response to detecting the occurrence of at least N scheduled subframes within the Y most recent subframe periods, transition to a second scheduling state and start the activity timer, wherein $1 \leq N \leq Y$; transition to the first scheduling state when the activity timer expires; and control selection of the first receiver vs. the second receiver based on control data, wherein the control data includes information indicating whether a current state equals the first scheduling state or the second scheduling state.

Additional embodiments are described in the following number paragraphs.

A1. A method for operating a user equipment (UE) device which is configured to wirelessly communicate with a cellular network, wherein the UE device includes a first receiver and a second receiver, the method comprising utilizing a processing agent to perform a set of operations, wherein the operations include: (a) analyzing a received control channel to detect occurrences of scheduled subframes; (b) dwelling in a first scheduling state when an activity timer is not running; (c) in response to each detection of the occurrence of a scheduled subframe, transitioning to a second scheduling state and starting the activity timer; (d) transitioning to the first scheduling state when the activity timer expires; and (e) controlling selection of the first receiver vs. the second receiver based on control data, wherein the control data includes information indicating whether a current state equals the first scheduling state or the second scheduling state, wherein the second receiver is configured to operate with higher power than the first receiver, wherein the second receiver employs a more complex decoding algorithm that achieves lower decoding error rate and/or higher data rate than the first receiver.

A2. The wireless UE device of claim A1, wherein the control data also includes a measure of channel condition and/or a measure of received signal interference.

A3. A wireless user equipment (UE) device configured to wirelessly communicate with a cellular network, the UE device comprising: a first receiver; a second receiver configured to operate with higher power than the first receiver, wherein the second receiver employs a more complex decoding algorithm that achieves lower decoding error rate and/or higher data rate than the first receiver; a processing agent configured to: (a) analyze a received control channel to detect occurrences of scheduled subframes; (b) dwell in a first scheduling state when an activity timer is not running; (c) in response to each detection of the occurrence of a scheduled subframe, transition to a second scheduling state and start the activity timer; (d) transition to the first scheduling state when the activity timer expires; and (e) control selection of the first receiver vs. the second receiver based on control data, wherein the control data includes information indicating whether a current state equals the first scheduling state or the second scheduling state.

Filter-Based Measurement of Data Scheduling Activity

In some embodiments, the state (high or low) of the data scheduling activity may be determined by filtering a binary-valued signal X(n) that represents instantaneous presence or absence of a scheduled sub-frame as a function subframe index n, and then applying a threshold to the output of the filter. See, for example, FIG. 10. The input signal X(n) (an example of which is denoted by item number 1005 in FIG. 10) equals one if the $n^{th}$ subframe is scheduled, and otherwise equals zero. In some embodiments, the filter requires a certain amount of time to converge, i.e., to achieve valid output. The convergence time depends on the temporal width of the filter impulse response, e.g., on the size of a filter window in the case of an FIR filter, or on the filter parameter value(s) in the case of an IIR filter. The output of the filter may be ignored (i.e., not used to make decisions on whether the data scheduling activity is high or low) until the filter converges.

The filter may be an FIR filter or an IIR filter (e.g., a 1-tap IIR filter, or more generally, an $m_T$-tap IIR filter, where $m_T$ is a positive integer). In the FIR case, the filter may be configured so that its output is equal to the data scheduling ratio over the extent of a filter window. For example, in one embodiment, an FIR filter may be configured so that its impulse response coefficients are equal to $1/N_{FIR}$, where $N_{FIR}$ is the width of the window used by the FIR filter. In other embodiments, the FIR filter may be configured so that its impulse response coefficients conform to a Gaussian function, a raised cosine function, a polynomial function, etc. A wide variety of other possibilities are contemplated.

In some embodiment, the filter may a causal filter, while in other embodiments the filter may be a non-causal filter.

To decrease the amount of time (from the start time n=0) until the filter output is usable to make a meaningful decision regarding data scheduling activity, the filter may be initially configured so that the temporal width of its impulse response is small, and then repeatedly re-configured so that the temporal width gradually (e.g., continuously, or smoothly, or linearly, or in a piecewise linear fashion, or in a piecewise constant fashion) increases until the temporal width reaches a steady state value. In the case of an FIR filter, this goal may be achieved by gradually increasing the size of the filter window, i.e., the size of the moving window of input signal data used to determine the instantaneous output of the filter. In the case of a single-tap IIR filter, the goal may be achieved by gradually decreasing the value of the filter coefficient. See the discussion below of IIR filter initialization.

Gradual Initialization of FIR Filter

Figure 10:
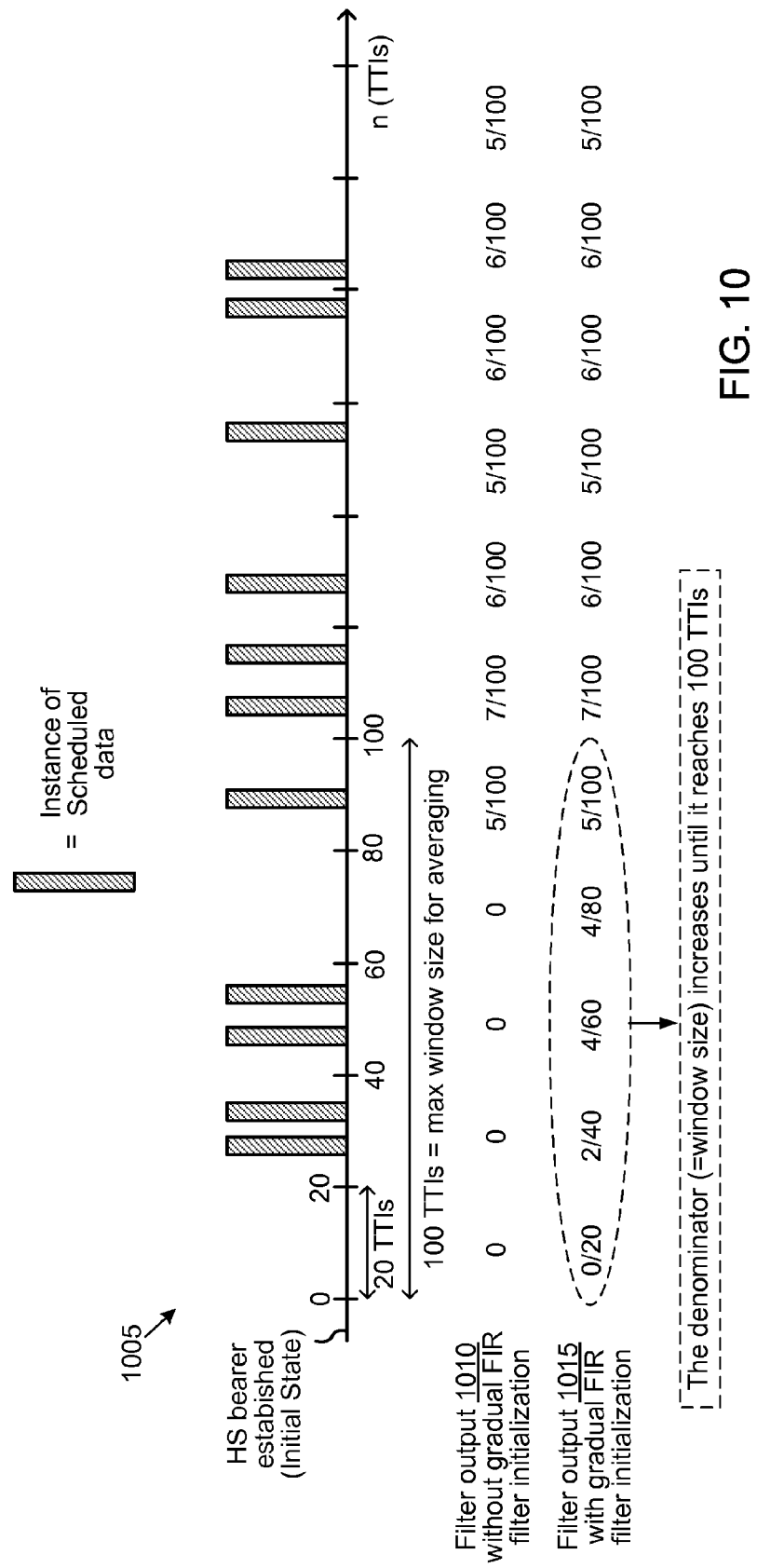
FIG. 10 illustrates the notion of determining data scheduling activity using an FIR filter without and without gradual filter initialization.

As described above, the FIR filter may be initialized by gradually increasing the size of the filter window. Both non-gradual initialization 1010 and gradual initialization 1015 are illustrated in FIG. 10. In some embodiments, the output of the filter may be evaluated on a periodic basis (e.g., every 20 TTIs in the example of FIG. 10). Each evaluation may involve comparing the output of the filter to a threshold in order to distinguish between high and low data scheduling activity.

In non-gradual initialization 1010, the filter has a fixed window size (i.e., 100 TTIs in the example of FIG. 10). The output of the filter may be purposely suppressed, i.e., set equal to zero, until the subframe index n reaches 100 TTIs. (The output of the filter may be deemed to be not sufficiently reliable until the time index n is greater than or equal to the window size.) At that point, the filter outputs the data scheduling ratio every 20 TTIs. The scheduling ratio may be computed as the ratio of the number of scheduled data subframes within the filter window to the size of the filter window. (The filter window may also be referred to herein as the "measurement window".)

In gradual initialization 1015, the window size of the filter gradually increases, e.g., starting at 20 TTIs for the first output evaluation time at n=20, increasing to 40 TTIs for the second output evaluation time at n=40, increasing to 60 TTIs for the third output evaluation time at n=60, increasing to 80 TTIs for the fourth output evaluation time at n=80, and saturating at 100 TTIs for the fifth output evaluation time at n=100 and thereafter. (The pattern of increase need not be linear as in this example. More generally, the window size is an increasing function that starts at some appropriately small value, to produce a fast initial response, and saturates at a steady state value. Furthermore, the starting size and the saturating size of the filter window may take any desired values, e.g., depending on the specific application context.) Thus, for the given pattern of scheduling activity and the given schedule of window size variation, the filter produces the following sequence of scheduling ratio values as output:

0/20, 2/40, 4/60, 4/80, 5/100, 7/100, 6/100, 5/100, 6/100, 6/100, 5/100.

Note that the denominator increases in correspondence to the window size. After the denominator reaches 100 TTIs, the ratios are identical to the ratios produced in the non-gradual initialization case.

Contrasting the two cases, note that the threshold condition (i.e., the condition that filter output≥threshold) is satisfied for the first time at n=100 in the non-gradual case 1010, and at n=40 in the gradual initialization case 1015, assuming a threshold value of 0.05. Thus, the gradual initialization enables much faster transition after startup to the state of high data scheduling activity.

Gradual Initialization of 1-Tap IIR Filter

As described above, the gradual initialization process may in some embodiments be performed with an IIR filter. A typical 1-tap IIR filter may be expressed as:

$$Y(n)=(1-\alpha)*Y(n-1)+\alpha*X(n),$$

where $\alpha$ is a positive filter coefficient, e.g., a value in the range interval (0,1]. X(n) is the filter input, and Y(n) is the filter output. Also recall that X(n)=1 when the data packet at the $n^{th}$ subframe is scheduled, and X(n)=0 otherwise.

Let N=floor(1/α), where floor(z) means the greatest integer that is less than or equal to z. To implement gradual initialization, the IIR filter may conform to the following expressions:

$$Y(n)=(1-\alpha_n)*Y(n-1)+\alpha_n*X(n),$$

$$\alpha_n=1/n, \text{ if } n \leq N,$$

$$\alpha_n=\alpha, \text{ if } n > N,$$

where $\alpha$ is a predetermined constant value. In other words, the filter coefficient starts from 1 when n=1 and gradually decreases until it becomes equal to (or very close to) $\alpha$.

Method 1100 (FIG. 11)

In one set of embodiments, a method 1100 for operating a wireless user equipment (UE) device may include the operations shown in FIG. 11. (The method 1100 may also include any subset of the features, elements and embodiments described above.) The UE device is configured to wirelessly communicate with a cellular network, and includes a first receiver and a second receiver. The second receiver is configured to operate with higher power than the first receiver. Furthermore, the second receiver employs a more complex decoding algorithm that achieves lower decoding error rate and/or higher data rate than the first receiver.

At 1110, a processing agent (e.g., as variously described above) may receive a sequence of binary-valued indicators corresponding respectively to a sequence of time intervals, wherein each of the binary-valued indicators indicates whether or not a subframe is scheduled in a corresponding one of the time-intervals. The binary-valued indicators may be obtained by monitoring a received control channel. (For example, in the context of HSDPA, the control channel may be the HS-SCCH.)

At 1115, the processing agent may filter the sequence of binary-valued indicators with a filter to obtain an output sequence, e.g., as variously described above. (The values of the output sequence may be, e.g., real values or fixed-point values.) The action of filtering the sequence of binary-valued indicators may include increasing a temporal width of an impulse response of the filter from a first positive value to a second positive value that is larger than the first positive value. The increase of the temporal width may be gradual or continuous or smooth or logarithmic or exponential or polynomial shaped, etc. In some embodiments, the pattern of increase may be linear or piecewise linear or piecewise constant.

At 1120, the processing agent may apply a threshold to a current value of the output sequence to obtain a decision value indicating whether the state of scheduling activity is high or low.

At 1125, the processing agent may control selection of the first receiver vs. the second receiver based on control data including the decision value. When the decision value indicates a state of high data scheduling activity, the selection may be biased towards the second receiver. Conversely, when the decision value indicates a state of low data scheduling activity, the selection may be biased towards the first receiver. Other factors may be involved in the selection, e.g., as described in connection with FIG. 5.

In some embodiments, the first receiver employs a linear equalization algorithm, and/or, the second receiver employs an advanced interference cancellation algorithm, e.g., as variously described above.

In some embodiments, the control data also includes a measure of channel condition, e.g., as variously described above.

In some embodiments, the control data also includes a measure of received signal interference, e.g., as variously described above.

In some embodiments, the control data also includes a measure of channel condition and a measure of received signal interference, e.g., as variously described above.

In some embodiments, the filter is a single-tap IIR filter. In these embodiments, the temporal width of the filter impulse response may be increased by decreasing a filter coefficient corresponding to the single tap over a predetermined interval of time.

In some embodiments, the filter is an FIR filter. In these embodiments, the temporal width of the filter impulse response may be increased by increasing the size of a filter window used by the FIR filter over a predetermined interval of time, e.g., as variously described above.

In one set of embodiments, a wireless user equipment (UE) device may be configured to wirelessly communicate with a cellular network as follows. The UE device may include a processing agent, a first receiver and a second receiver. (The UE device may also include any subset of the features, elements and embodiments described above.) The second receiver is configured to operate with higher power than the first receiver. Furthermore, the second receiver employs a more complex decoding algorithm that achieves lower decoding error rate and/or higher data rate than the first receiver. The processing agent may be configured to: receive a sequence of binary-valued indicators corresponding respectively to a sequence of time intervals, wherein each of the binary-valued indicators indicates whether or not a subframe is scheduled in a corresponding one of the time-intervals; filter the sequence of binary-valued indicators with a filter to obtain an output sequence, wherein said filtering includes increasing a temporal width of an impulse response of the filter from a first positive value to a second positive value which is larger than the first positive value; apply a threshold to a current value of the output sequence to obtain a decision value indicating whether a state of data scheduling activity is high or low; and control selection of the first receiver vs. the second receiver based on control data including the decision value.

Additional embodiments are disclosed in the following numbered paragraphs.

1. A wireless user equipment (UE) device configured to wirelessly communicate with a cellular network, the UE device comprising: a first receiver; a second receiver configured to operate with higher power than the first receiver, wherein the second receiver employs a more complex decoding algorithm that achieves lower decoding error rate and/or higher data rate than the first receiver; a processing agent configured to: (a) analyze a received control channel to detect occurrences of scheduled subframes; (b) dwell in a first scheduling state when an activity timer is not running; (c) in response to detecting the occurrence of at least N scheduled subframes within the Y most recent subframe periods, transition to a second scheduling state and start the activity timer, wherein $1 \leq N \leq Y$; (d) transition to the first scheduling state when the activity timer expires; and (e) control selection of the first receiver vs. the second receiver based on control data, wherein the control data includes information indicating whether a current state equals the first scheduling state or the second scheduling state.

2. The wireless UE device of paragraph 1, wherein the first receiver employs a linear equalization algorithm, and/or, the second receiver employs an advanced interference cancellation algorithm.

3. The wireless UE device of paragraph 1, wherein the control data also includes a measure of channel condition and/or a measure of received signal interference.

4. The wireless UE device of paragraph 1, wherein $N=Y=1$.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system or a device (e.g., a UE device 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system or device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a wireless user equipment (UE) device configured to wirelessly communicate with a cellular network, wherein the UE device includes a first receiver and a second receiver, the method comprising:

utilizing a processing agent to perform a set of operations, wherein the operations include:

analyzing a received control channel to detect occurrences of scheduled subframes, wherein the analyzing the received control channel includes filtering a binary value signal that includes binary-valued indicators, wherein each binary-valued indicator is in either a first state that represents a presence of a scheduled subframe in a corresponding subframe period or a second state that represents an absence of a scheduled subframe in a corresponding subframe period;

dwelling in a first scheduling state of first data scheduling activity when an activity timer of predetermined duration is not running;

in response to detecting, in the analysis of the received control channel, the occurrence of at least N scheduled subframes, as indicated by N binary-valued indicators in the first state, within the Y most recent subframe periods, transitioning to a second scheduling state of second higher data scheduling activity and start the activity timer, wherein $1<N\le Y$;

transitioning to the first scheduling state when the activity timer expires; and controlling selection of the first receiver or the second receiver based on control data, wherein the control data includes information indicating whether a current state equals the first scheduling state or the second scheduling state, wherein the second receiver is configured to operate with higher power than the first receiver, wherein the second receiver achieves lower decoding error rate and/or higher data rate than the first receiver.

2. The method of claim 1, wherein the first receiver employs a linear equalization algorithm.

3. The method of claim 1, wherein the second receiver employs an advanced interference cancellation algorithm.

4. The method of claim 1, wherein the control data also includes a measure of channel condition and/or a measure of received signal interference.

5. The method of claim 1, wherein $1<N<Y$.

6. A non-transitory computer-readable memory medium for operating a wireless user equipment (UE) device, wherein the UE device includes a first receiver and a second receiver, wherein the memory medium stores program instructions, wherein the program instructions, when executed by a processor, cause the processor to:

analyze a received control channel to detect occurrences of scheduled subframes, wherein the analyzing the received control channel includes filtering a binary value signal that includes binary-valued indicators, wherein each binary-valued indicator is in either a first state that represents a presence a scheduled subframe in a corresponding subframe period or in a second state that represents an absence of a scheduled subframe in a corresponding subframe period;

dwell in a first scheduling state of first data scheduling activity when an activity timer of predetermined duration is not running;

in response to detecting, in the analysis of the received control channel, the occurrence of at least N scheduled subframes, as indicated by N binary-valued indicators in the first state, within the Y most recent subframe periods, transition to a second scheduling state of second higher data scheduling activity and start the activity timer, wherein $1<N\le Y$;

transition to the first scheduling state when the activity timer expires; and control selection of the first receiver or the second receiver based on control data, wherein the control data includes information indicating whether a current state equals the first scheduling state or the second scheduling state, wherein the second receiver is configured to operate with higher power than the first receiver, wherein the second receiver achieves lower decoding error rate and/or higher data rate than the first receiver.

7. The non-transitory memory medium of claim 6, wherein the first receiver employs a linear equalization algorithm.

8. The non-transitory memory medium of claim 6, wherein the second receiver employs an advanced interference cancellation algorithm.

9. The non-transitory memory medium of claim 6, wherein the control data also includes a measure of channel condition.

10. The non-transitory memory medium of claim 6, wherein the control data also includes a measure of received signal interference.

11. The non-transitory memory medium of claim 6, wherein $1<N<Y$.

12. A method for operating a wireless user equipment (UE) device which is configured to wirelessly communicate with a cellular network, wherein the UE device includes a first receiver and a second receiver, the method comprising:

utilizing a processing agent to perform operations including:

receiving a downlink control channel that includes a sequence of binary-valued indicators corresponding respectively to a sequence of time intervals that downlink data may be scheduled on, wherein each of the binary-valued indicators indicates whether or not a subframe is scheduled in a corresponding one of the time-intervals;

filtering the sequence of binary-valued indicators with a filter to obtain an output sequence indicative of a number scheduled subframes within a temporal width of an impulse response of the filter, wherein said filtering includes increasing the temporal width of the impulse response of the filter from a first positive value to a second positive value which is larger than the first positive value, and wherein said filtering includes determining a ratio of the number of scheduled subframes to the temporal width of the impulse response;

applying a threshold ratio to the determined ratio to obtain a decision value indicating whether a state of data scheduling activity is high or low; and controlling selection of the first receiver or the second receiver based on control data including the decision value, wherein the second receiver is configured to operate with higher power than the first receiver, wherein the second receiver achieves lower decoding error rate and/or higher data rate than the first receiver.

13. The method of claim 12, wherein the first receiver employs a linear equalization algorithm.

14. The method of claim 12, wherein the second receiver employs an advanced interference cancellation algorithm.

15. The method of claim 12, wherein the control data also includes a measure of channel condition.

16. The method of claim 12, wherein the control data also includes a measure of received signal interference.

17. The method of claim 12, wherein the filter is a single-tap IIR filter, wherein the temporal width of the filter impulse response is increased by decreasing a filter coefficient corresponding to the single tap over a predetermined interval of time.

18. The method of claim 12, wherein the filter is an FIR filter, wherein the temporal width of the filter impulse response is increased by increasing a size of a filter window used by the FIR filter over a predetermined interval of time.

\* \* \* \* \*